United States Patent [19]

Dickens, Jr. et al.

[11] Patent Number: 5,304,329
[45] Date of Patent: Apr. 19, 1994

[54] METHOD OF RECOVERING RECYCLABLE UNSINTERED POWDER FROM THE PART BED OF A SELECTIVE LASER-SINTERING MACHINE

[75] Inventors: Elmer D. Dickens, Jr., Richfield; Glenn A. Taylor, Twinsburg; Frederic W. Kunig, Akron; Angelo J. Magistro, Brecksville; Eric M. Weissman, Chagrin Falls; Timothy R. Hradek, Cleveland, all of Ohio

[73] Assignee: The B.F. Goodrich Company, Akron, Ohio

[21] Appl. No.: 980,003

[22] Filed: Nov. 23, 1992

[51] Int. Cl.$^5$ .............................................. B29C 35/08
[52] U.S. Cl. ...................................... 264/25; 264/37; 264/122; 264/125; 264/308
[58] Field of Search ................. 264/22, 25, 37, 122, 264/125, 308

[56] References Cited

U.S. PATENT DOCUMENTS

| | | | |
|---|---|---|---|
| 4,247,508 | 1/1981 | Housholder | 264/219 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,038,014 | 8/1991 | Pratt et al. | 264/25 X |
| 5,132,143 | 7/1992 | Deckard | 427/197 |
| 5,147,587 | 9/1992 | Marcus et al. | 264/22 |
| 5,185,108 | 2/1993 | Shimandale | 264/11 |

Primary Examiner—Mary Lynn Theisen
Attorney, Agent, or Firm—Alfred D. Lobo; Nestor W. Shust

[57] ABSTRACT

This method teaches how to recover and reuse a powder of a thermally degradable material which is used in a selective laser sintering (SLS) process. To recycle such a laser-sinterable powder successfully in a SLS machine it is protected against degradation by cooling the hot bed while layer-upon-layer (layer-wise) of powder is being sintered, seriatim, to form successive slices fused together to form an article of arbitrary shape (part). The process requires maintaining the powder which has more than 80% of the number of particles <53 μm as a quiescent bed which is nevertheless porous enough to permit flowing a cooling gas downwardly through the bed without disrupting its surface. Since each slice is formed at the surface, and the part, as it is formed, is supported in a well-insulated bed, the powder adjacent the slice is at a much higher temperature than powder in the rest of the bed, which, but for the cooling gas, would get overheated. Overheated powder not only degrades but is fused to the surfaces of the hot part forming a "growth" which makes the part unusable for its intended purpose. The process allows one to recycle the unused powder from the bed to extinction, economically. If the powder, when hot, is also sensitive to oxygen, an inert gas is used as the cooling gas.

22 Claims, 5 Drawing Sheets

METHOD OF RECOVERING RECYCLABLE UNSINTERED POWDER FROM THE PART BED OF A SELECTIVE LASER-SINTERING MACHINE

BACKGROUND OF THE INVENTION

This invention relates to a novel method of recovering recyclable unsintered but "used" powder from a 'part' bed of a Selective Laser Sintering ® (SLS ®) machine operated in such a manner as to allow unsintered powder to remain in such near-pristine condition as to form a sintered part which is essentially indistinguishable from one formed by sintering "virgin" powder. By "virgin" powder we refer to powder which has never been exposed to the laser-environment of a SLS machine.

More particularly this invention is directed to the recovery and reuse of powder which is difficult to recycle because it is either, thermally or thermooxidatively degradable ("TOD") in the environment of the part bed.

Still more particularly this invention is directed to the recovery and recycle of a TOD synthetic resinous semicrystalline or substantially crystalline powder which has a two-tier particle size distribution in a critically defined particle size range, most of which particles are "fines" smaller than 53μm, the remaining being smaller than 180μm (referred to as "large particles"). The powder is stripped of substantially all too-large particles (termed "rocks") larger than 180μm (80 mesh, U.S. Standard Sieve Series). By "substantially all" we mean that at least 95% of the number of "rocks" in the powder are removed.

The two-tier distribution of the sizes of the particles free of substantially all rocks allows (i) the powder to be freely flowable even when hot, particularly at near the powder's softening temperature $T_s$; and, (ii) the formation of a "quiescent part bed" through which cooling gas may be flowed without disrupting the bed, making it possible to control the temperature profile of the bed.

By "freely flowable" we refer to a mass of small particles, the major portion of which, and preferably all of which have a sphericity of at least 0.5, and preferably from 0.7 to 0.9 or higher, so that the mass tends to flow steadily and consistently as individual particles. Though such flow is conventionally considered a characteristic of a powder which flows through an orifice slightly larger than the largest particle, such flow (through an orifice) is of less importance than the ability of a tailored SLS powder to be picked up in the nip of a rotating roller and transported by it as an elongated fluent mass of individual particles urged along by the roller. A freely flowable powder has the critical property of being able to be urged as a dynamic elongated mass, referred to as a "rolling bank" of powder, by the rotating roller even when the powder is at a temperature near $T_s$.

To form a sintered part in a SLS machine, an initial slice is sintered from powder held in the part bed at near $T_s$ but well below $T_c$. By "near $T_s$" we refer to "near the softening point", a temperature within about 5° C. of $T_s$, that is $T_s \pm 5$, preferably $T_s \pm 2$.

By "softening point" we refer to $T_s$ at which a powder's storage modulus ($G'_s$) has decreased substantially from its value of G, at room temperature. At or above $T_s$ the storage modulus $G'_s$ of a sintered slice of the powder is low enough so as not to let it "curl". The sintered layer will curl when the initial slice sintered by the laser, heats the uppermost, newly-spread layer of powder, which is spread over the hot sintered part, more than the lower portion (referred to as "differential heating") of the bed, and the newly spread layer is below $T_s$. The importance of countering curl is most critical when the first slice and the subsequent initial slices are formed.

By a "quiescent bed" we refer to one upon the surface of which the particles are not active, that is, do not move sufficiently to affect the sintering of each layer spread upon a preceding slice sintered in the part bed. The bed is not disrupted by the downward flow of gas, so that the bed appears to be static.

To be useful as a laser-sinterable powder, a powder must have unique characteristics which allow it to be sinterd to form a part which is visually essentially indistinguishable from a similar dimensioned part which is not sintered. At the same time, the part formed is required to have "clean" surfaces, free of "growth". The term "growth" refers to particles so tightly adhered to the surface as to be removed satisfactorily only with a machining step. Such growth makes a sintered part unfit for the purpose at hand, namely to function as a prototype for a compression molded part. Such a powder into which specific physical characteristics have been inculcated to ensure its performance in a SLS machine is referred to as a "designed" or "tailored" SLS powder. Such a powder is disclosed in concurrently filed copending patent application Ser. No. 07/980,004. A tailored powder is preferably of an unblended synthetic resinous material such as Nylons 6, 11 and 12, polybutylene terephthalate, wax, polycarbonate, etc. having physical properties defined herebelow, which powder provides an absorption coefficient in a range suitable for the particular laser used.

A sintered article (or "part") formed by laser-sintering the tailored powder, though porous, has the precise dimensions of the shape desired, that is, ±125μm. By the term "porous" we refer to a density in the range from 60%–95% (void fraction from 0.4 to as low as 0.05), typically from 60%–80% of the density (void fraction 0.4–0.2) of an isotropically (say, compression) molded article which is deemed to be fully dense. Under critically defined conditions, one may produce a "near-fully dense" part from the tailored SLS powders referred to above.

The term "near-fully dense" refers to a slightly porous article which has a density in the range from 80%–95% (void fraction from 0.2 to as low as 0.05), typically from 85%–90% of the density (void fraction 0.15–0.1) of a compression molded article which is deemed to be fully dense.

The usual, common and realistic goal in the practical operation of a SLS machine is to sinter a mass of primary particles of a synthetic resin, typically nylon 6, 11, 12, polycarbonate or wax, to produce a "look-alike" prototype. The term "prototype" refers to an article which has identical inside and outside dimensions as the original. In the particular instance where the tailored powder is to produce a "near-fully dense" part, the goal is to produce a "working" prototype. A working prototype may be used under comparable conditions as the original except for those where strength near ultimate elongation is required. However, as indicated hereinabove, the prerequisite for forming a working prototype is the use of a powder with unique properties specifically tailored for its end use, which powder is the subject matter of the aforementioned sister application.

The prototype is formed by selectively laser-sintering a powder in the SLS machine which uses a laser beamed upon a target area where the part is produced. A powder dispenser system deposits a "layer" of powder from a "powder feed bed" or "feed bed" onto a "part bed" which is the target area. The term "layer" is used herein to refer to a predetermined depth (or thickness) of deposited powder before it is sintered. A layer of powder is confined by vertically spaced apart horizontal planes, no more than about 250 $\mu$m apart, preferably no more than 180 $\mu$m apart.

A laser control mechanism operates to direct and move the laser beam and to modulate it, so as selectively to sinter only the powder disposed within defined boundaries, to produce the desired "slice" of the part. The term "slice" is used herein to refer to a sintered portion of a deposited layer. The control mechanism operates selectively to sinter sequential layers of powder, producing a completed part comprising a plurality of slices sintered together. The defined boundaries of each slice corresponds to respective cross-sectional regions of the part. Preferably, the control mechanism includes a computer—e.g. a CAD/CAM system to determine the defined boundaries for each slice. That is, given the overall dimensions and configuration of the part, the computer determines the defined boundaries for each slice and operates the laser control mechanism in accordance with the defined boundaries for each slice. Alternatively, the computer can be initially programmed with the defined boundaries for each slice.

A part is produced by depositing a first portion of sinterable powder onto a target surface of the part bed, scanning the aim of a laser over the target surface, and sintering a first layer of the first portion of powder on the target surface to form the first slice. The powder is sintered by operating the directed laser beam within the boundaries defining the first slice, at a high enough energy to sinter the powder. The first slice corresponds to a first cross-sectional region of the part.

A second portion of powder is deposited onto the first sintered slice and the aim of the laser beam scanned over the first sintered slice. A second layer of the second portion of powder is sintered by operating the laser beam within the boundaries defining the second slice. Formation of the second sintered slice also integrally joins the first and second slices into a cohesive mass. Successive layers of powder are deposited onto the previously sintered slices, each layer being sintered in turn to form a slice.

Repetition of the foregoing steps results in the formation of a laser-sintered article lying in a "part bed" of powder which continually presents the target surface. If the particles of powder at the boundaries of each layer are overheated sufficiently to be melted, unmelted particles immediately outside the boundaries adhere to the molten particles within, and the sharp definition of the surface of the sintered article is lost. Without sharp definition at the boundaries, the article cannot be used as a prototype.

It is therefore essential that the particles of powder adjacent the surfaces of the article to be formed, resist being strongly adhered to those surfaces. When particles are not so strongly adhered they are referred to as "fuzz" because fuzz is easily dislodged from the surface, manually, and the dislodged particles retain most of their individual identities. A method for sintering a shaped "part" of arbitrary shape from powder in a SLS machine is disclosed in U.S. Pat. Nos. 4,247,508 to Housholder; 4,863,538 and 5,132,143 to Deckard; 4,938,816 to Beaman et al; and, 4,944,817 to Bourell et al, the disclosure of each of which is incorporated by reference thereto as if fully set forth herein. It will be evident that the thrust of the foregoing disclosures is to form a sintered part on a bed of powder using a directed laser beam.

The references taught using a down-draft of air to control the temperature of the powder (see the '143 patent, col 4, lines 16–27) by adjusting the air temperature to above the softening point of the powder, but below the temperature at which significant sintering will occur (bridging cols 6 and 7). Air was used to heat the surface of the bed of powder, not cool it. Further, there is no suggestion how this could be accomplished with a powder having at least 80% of the total number of particles present as "fines" <53$\mu$m. Such fines from 1$\mu$m-53$\mu$m have a relatively high tapped density in a bed which one would expect to provide excellent particle-to-particle heat transfer, and also to generate a high enough pressure drop to require a high-pressure gas source, with the expected result that the bed would be disrupted when gas is flowed downwardly through it.

Though the concept of recovering and recycling unsintered powder from the bed is not a novel one, the ability to recover and reuse a powder which is TOD, is. There was no indication in the '143 patent as to what might be the physical condition of the used but unsintered powder, particularly if it was TOD, and no recognition of the fact that, after being sintered, the very hot part is susceptible to thermal distortion because it rests in an effectively insulated bed of powder which is then continuously heated not only with the incoming air but also with the radiating sintered part. Further, there was no recognition that hot air, at the temperature required, on the surfaces of a synthetic resinous material, would lead to thermooxidative degradation.

Most of all there is no suggestion that the used powder might be recovered in particulate form, or used for any purpose whatsoever. There is no stated concern about recycling unsintered powder, no mention of what considerations affected the definition of the surfaces of the sintered part, and no clear indication of what was referred to as "sintering" with a laser beam.

"Sintering" is defined by the heating of the powder to a temperature which causes viscous flow only at contiguous boundaries of its particles, with at least some portion of substantially all particles remaining solid. Such sintering causes coalescence of particles into a sintered solid mass the bulk density of which is increased compared to the bulk density of the powder particles before they were sintered.

The SLS machine uses a directed infra-red laser beam having a wavelength of 10.6$\mu$m upon a target area where the part is produced, and lasers having other wavelengths may be used if desired. Conventionally, when powders are sintered under conditions which are likely to generate flammable byproducts, the SLS process is operated in an oxygenstarved nitrogen atmosphere, which means that enough $N_2$ is flowed into the sintering chamber to maintain a concentration of $O_2$ lower than will support combustion, usually less than about 5%. At the end of each sintering cycle, the flow of $N_2$ is shut off, and the door of the sintering chamber is opened. For obvious economic reasons, no more $N_2$ is used than is necessary to negate the possibility of a fire.

Since only a minor fraction by weight of the particles in the part bed are incorporated in the sintered part, that is "used", the remaining used but unsintered particles should be recyclable through the SLS machine. Stated differently, if the "unsintered" particles from the part bed are freely flowable and essentially indistinguishable from virgin particles, it should be possible to reuse the unsintered powder from the part bed.

As of the present time, it has been difficult to reuse "unsintered" recovered powder of any of several synthetic resinous materials to form a part with demanding specifications for density and surface finish, because the individual particles of powder are either thermally or oxidatively degraded, or both, that is "thermooxidatively degraded". Even if the particles themselves are not degraded, overheating the part bed to $T_c$, the temperature at which the particles agglomerate ("clump"), causes high enough interparticle bonding that clumps recovered from the part bed are not friable enough to regenerate a freely flowable mass of powder. Therefore the used powder cannot be reused, the cost being attributed to the part formed.

The goal of the invention is to produce a sintered part from used but unsintered powder (referred to as "recyclable" or "re-usable" powder); and to provide a method for operating a SLS machine so that one can recycle powder from the part bed, without noticeable prejudice to the physical properties of the newly sintered part containing only recycled powder, relative to the properties of a part sintered from only virgin powder.

More specifically, the recyclable powder is just as freely flowable as the virgin sinterable powder at a temperature near $T_s$ and becomes sticky at the same "sticky" or "caking" temperature $T_c$ as the virgin powder. This caking temperature $T_c$ may be as little as about 2° C. to 25° C. above $T_s$. The difference between $T_c$ and $T_s$ is referred to as the "window of sinterability" or "T-window", but will be referred to hereinafter as the "SLS-window".

By "sticky" or "caking" we infer that the force required to separate contiguous particles has exceeded an acceptable limit for the purpose at hand. The caking temperature $T_c$ is reached when the critical storage modulus ($G'_c$) of the powder has been reached or exceeded. The storage modulus is a property of the powder akin to a material's tensile strength and can be measured directly with a Rheometrics dynamic mechanical analyzer.

The temperature at which the powder is freely flowable may be as low as desired, except that if the too-cool powder is distributed over a newly-sintered and very hot slice, the slice will "curl". By "curl" we refer to the sintered layer becoming non-planar, one or more portions or corners of the sintered layer rising more than about 50μm above the surface of the last (uppermost) slice in the horizontal x-y-plane.

A slice will curl when there is a too-large mismatch between the temperature of the initial slice sintered by the laser and the bed of powder on which it lies; or, between powder freshly spread over a just-sintered slice and the temperature at the upper interface of the slice and the freshly spread powder. Such a mismatch is the result of differential heating. The importance of countering curl is most critical when the first slice is formed. If the first slice curls, the roller spreading the next layer of powder over the slice will push the slice off the surface of the part bed.

If the powder is transported from the feed bed to the part bed in which a hot slice is embedded, and the temperature at the interface $T_i$ between the hot upper surface of the slice and the freshly spread powder is high enough to raise the temperature of the freshly spread powder above $T_s$, this powder cannot be rollingly distributed over the hot slice because the powder sticks and smears over the hot slice. The indication is that the slice is too hot.

If the powder in the feed bed is too cool, that is, so cool that the equilibrium temperature on the surface of the hot, embedded slice is such that the temperature of the freshly spread powder is below $T_s$, the slice will curl.

The slice will not curl when the powder spread over it reaches an equilibrium temperature at the interface, and the equilibrium temperature is at or above $T_s$. The precise temperature $T_i$ at the interface is difficult to measure, but to form successive slices cohesively sintered together, the temperature of the powder at the interface must be above $T_s$, but below the powder's "sticky point" or "caking temperature" $T_c$ at which the powder will not flow.

The difficulty of rolling out a softened powder in a rolling bank dictates that the feed bed be maintained at as low a temperature $a_s$ will assure free flow over the surface of the part bed. Therefore the powder is usually stored in the feed bed at a temperature well below $T_s$ and transferred from the feed bed to the part bed at a temperature in the range from 2° C. to 40° C. below, more preferably from 5°–20° C. below the powder's $T_c$ at which the powder will not flow at all. When the powder which is at near $T_s$ is spread over a just-sintered slice, the powder quickly reaches or exceeds $T_s$ but is below $T_c$, so that the powder lies in the window of sinterablity.

The window of sinterability may be determined in a different procedure, recognizing that immediately after the initial slice is formed, the slice is much hotter than the powder on which it rests. Therefore a relatively cool powder, as much as about 40° C., but more typically about 20° C. below its $T_s$, may be spread over the hot slice and the interface temperature raises the temperature of the powder to near $T_s$. As the powder is spread evenly over the hot slice it is to remain cool enough to be spread, but soon thereafter, due to heat transfer at the interface, must reach or exceed $T_s$, or the just-sintered slice will curl; that is, the temperature of the powder must enter the "window of sinterability". This window may be measured by running two DSC (differential scanning calorimetry) curves on the same sample of powder, sequentially, with a minimum of delay between the two runs, one run heating the sample past its melting point, the other run, cooling the sample from above its melting point until it recrystallizes. The difference between the onset of melting in the heating curve, Tm, and the onset of supercooling in the cooling curve, Tsc, is a measure of the width of the window of sinterability. (see FIG. 6).

The upper limit of this SLS-window is defined by $T_c$ at which the powder softens so much that it will not flow. The lower limit of the window is the perceptible change in the property of the powder as seen in the cooling curve.

For this reason, an essential property of a recovered, recyclable powder is that it have an acceptably wide window to be laser-sinterable, that is, freely flowable at a temperature from about 25° C. and as little as about 2°

C. below $T_c$; more typically, it is about 5° C.-15° C. below $T_c$. When such a powder is recycled to a SLS machine, one is able to form a solid porous part of arbitrary shape, the void fraction of the part depending upon the particle size distribution of the powder.

The temperature at which the powder is freely flowable may be as low as desired except that if the temperature at which the powder is transferred to the part bed is too cool, that is, as little as 2° C. to 20° C below the powder's softening point $T_s$, the sintered slice will "curl".

At the start of a sintering cycle it is best to maintain the temperature of the feed bed near $T_s$ because the temperature of the part bed is maintained near $T_s$. However, as the mass of the sintered slices accumulates in the part bed the mass provides a large heat sink which transfers heat to each layer of powder freshly spread over the hot mass, thus allowing a relatively cool powder, as much as 30° C, more typically 20° C, lower than $T_s$ to be transferred from the feed bed, yet come to equilibrium at $T_s$ so that, when sintered, the slice will not curl. It is critical that the powder be "freely flowable" at a temperature in the SLS-window so that upon being spread upon the last sintered slice, it will not curl; or, upon formation of a slice from the freshly spread powder, the slice will not curl.

It will now be realized that the cooler the powder (below $T_s$) the higher the risk of curling; and the hotter the powder (above $T_s$) the higher the risk of caking. A powder is not freely flowable when the temperature at which it is held or distributed exceeds its $T_s$. The powder cakes and does not flow at all when the caking temperature is reached. At the caking temperature, $G'_s$ decreases to $G'_c$, where $G'_c$ represents the powder's critical storage modulus. This caking temperature is also referred to as the "$G'_c$ temperature".

It is therefore essential that a powder which has been held at its $T_s$ or slightly higher but below its $T_c$, be recoverable in particulate form from the part bed and that the recovered powder be freely flowable at or near $T_s$. Even so, there is no guaranty that the polymer chains near the surface of the used particles will be in essentially the same condition as those in particles of virgin powder. The condition of the polymer chains determines not only the temperature at which, but also the temperature range over which the critical viscosity required for fusing the particles is reached.

It is possible to transfer powder from the feed bed to the part bed at above the softening temperature of a powder if the impaired flowability allows one to do so, and the risk of operating closer to the caking temperature is acceptable. It will now be evident that an essential property of the tailored powder is that it be freely flowable in the "SLS window". This window is different for different materials, and ranges from about 2° C. to about 25° C.; more typically, it is about 5° C.-5° C. With such a powder one is able to form a solid near-fully dense article when the powder is sintered in a SLS machine.

The temperature at which $G'_s$ is measured is not narrowly critical provided the $G'_c$ temperature offers an adequately large SLS-window. A powder becomes sticky enough so as not to be freely flowable at its "sticky temperature" or caking temperature, when its $G'_s$ decreases to a critical $G'_c$, where $G'_s$ represents the powder's storage modulus. The storage modulus is a property of the powder akin to a material's tensile strength. The difference between $G'_s$ and $G'_c$ is referred to as the "G'-window" which also defines the "window of sinterability". Most desirable laser-sinterable powders have an unexpected common characteristic, namely that their $G'_c$ dictates their laser-sinterability, and this property is narrowly defined in the range from $1\times10^6$ dynes/cm$^2$ to $3\times10^6$ dynes/cm$^2$.

For a crystalline powder, the softening point $T_m$ is its melting point Tm. Therefore $G'_s$ and $G'_c$ essentially identical and there is no G'-window.

For an amorphous powder, its softening point is its initial glass transition temperature Tg. An amorphous powder offers a very large window of sinterability, but because its viscosity decreases too slowly as temperature increases and approaches the $G'_c$ limit of the SLS-window, the melt viscosity is still too high. That is, the melt viscosity is too high to allow requisite interchain diffusion at the boundaries of the particles without melting the entire particle. Therefore an amorphous powder is difficult to sinter to a near-fully dense part, and sintered parts formed have a void fraction in the range from 0.4 to 0.2. This infers that the condition of the unsintered powder in the bed is difficult to control.

Powders which are best suited for recovery and recycling are semi-crystalline powders such as nylon and polybutylene terephthalate (PBT) which provide signs of crystalline order under X-ray examination, and show a crystalline melting point as well as a glass transition temperature. Because the crystallinity is largely controlled by the number and distribution of branches along the chain, the crystallinity varies, bulky side chains or very long chains each resulting in a reduction of the rate of crystallization. Preferred polymers have a crystallinity in the range from 10% to 90%, more preferably from 15% to 60%. Powders which produce the least porous sintered parts are semi-crystalline powders having a crystallinity in the range from 50% to 90%.

By a "semi-crystalline polymer" is meant a resin which has at least 10% crystallinity as measured by thermal gravimetric analysis, preferably from about 25%-70%, and most preferably from about 60-90% as measured by differential scanning calorimetry.

Powder which is rolled out on to the part bed is not only preferably heated in the feed bed to a temperature at which a sintered slice will not curl, but the powder is also heated in the part bed due to heat dissipated from the sintered part. If the powder is over-heated in the part bed, it loses some, if not all of the physical properties which make the virgin powder suitable. For example, over-heated powder is no longer freely flowable.

Further, overheated particles tend to be thermooxidatively degraded as is typically evidenced by their change in color (a white powder will turn brown) and loss of tensile strength. It was not known that the presence of a very small quantity of oxygen, as little as 0.5%, in contact with particles in the part bed, was sufficient to degrade them.

It was found that in normal operation of a SLS machine using a synthetic resinous material there was sufficient thermooxidative degradation that the unsintered powder from the part bed could not be re-used for sintering another part of the same quality as one sintered from the virgin powder.

Although we have experimentally processed many synthetic resinous powders in the SLS machine, we have found that none is recyclable unless the part bed is kept from overheating after the sintered part is formed. We now understand, and have set forth below, what critical processing steps are required to recycle onceused powder a second time, or even several times, in a SLS machine.

Since it has now become evident that a semi-crystalline organic polymer is the powder of choice if it is to provide the high definition of surface ("lack of growth") which a prototype made from a tailored powder provides, it is even less economical to run a SLS machine without recycling the previously used but unsintered powder than it was when an amorphous powder was used.

In copending patent application Ser. No. 727,746 filed by Shimandle on Jul. 10, 1991, now U.S. Pat. No. 5,185,108, it was taught that to produce a sintered article of wax having a void fraction (porosity) of 0.1, a two-tier weight distribution of wax particles was necessary. Despite the relatively low temperature at which the part bed is maintained, there is no indication that any portion of the used powder from the sintered bed could be reused. Neither was there any indication that the '746's two-tier distribution of particle sizes was beneficial for any reason other than that it provided the densest packing of the particles.

It has now been found that the rate of heat transfer into the mass of a small particle, which rate is higher than that into the mass of a large particle, dictates that the desired sinterable powder be deliberately tailored in a two-tier particle size distribution. The ranges of sizes in the two-tier distribution of particles used in the novel process is different from the ranges of the two-tier distribution of Shimandle et al's wax powder. Quite unexpectedly, despite the numerical predominance of particles smaller than $53\mu m$, the few "large particles"-'$<53\mu m$ in the two-tier distribution of particles in the powder used in this novel process, (i) imbue the powder with free-flowability near Ts; (ii) provide a bed with sufficient porosity to permit downflow of low pressure inert gas through it, thus permitting the formation of a sintered part, whether large or small; and (iii) allow a predetermined temperature profile to be maintained in the vertical plane of the part bed, irrespective of the density of the sintered part formed; with the result that, undesirable "growth" on the part is essentially negated, and the unsintered powder is recoverable and reusable.

It was thus found that using a laser-sinterable powder defined by two critical quantifiable physical properties, namely (i) a desirable "SLS- window", and, (ii) a narrowly defined particle size range in a two-tier size distribution, was a prerequisite to recoverability and reusability of the unsintered powder.

The unexpected effect of using the tailored powder with a defined SLS-window is supported by evidence of the sinterability of the powder in this window. The SLS-window is directly correlatable to the powder's fundamental properties defined by its $G'_c$ temperature.

A tailored powder with preferred properties: (a) is a freely-flowable semi-crystalline powder at near $T_s$ having at least 10%, preferably at least 25%, crystallinity measured by differential scanning calorimetry; (b) a major portion by weight of the powder, and preferably essentially all the powder having a sphericity in the range from greater than 0.5 to 0.9, and a two-tier particle size distribution of primary particles having an average diameter smaller from than $180\mu m$, with substantially no particles $>180\mu m$, provided further that the number average ratio of particles smaller than $53\mu m$ is greater than 80%, preferably greater than 90%, and most preferably greater than 95%, the remaining particles being in the size range from $53\mu m$ to $180\mu m$; a layer of the powder no more than $250\mu m$ deep absorbs essentially all infra-red energy at the $10.6\mu m$ wavelength beamed therethrough, and absorbs more than 50% of that energy in a layer no more than $180\mu m$ thick;

(c) a SLS window in the range from 2° C. to 25° C. below $T_s$;

(d) a melt viscosity in the range from $100-10^4$ poise (10-1000 Pa-sec) when the temperature of the powder being sintered exceeds $T_c$ in less time than is required to melt contiguous large particles $>53\mu m$;

(e) a critical storage modulus $G'_c$ in the range from $1 \times 10^6$ Pa to $3 \times 10^6$ Pa; and, (f) forms a sintered part in a bed which, during operation sintering a part, has a temperature profile defined by sequential positive and negative temperature gradients in the vertical plane of the bed when a layer thereof, less than $250\mu m$ thick near the surface, is at a temperature in the range from 5° C. to 20° C. below $T_s$.

The unexpected effect of using the tailored powder with defined particle size in a SLS machine is supported by evidence of the "coolability" of the hot bed despite its narrowly defined porosity range, without which coolability the necessary temperature profile in the part bed could not be maintained. An identifying characteristic of a novel, hot 'part bed' at near $T_s$ of the powder, is that the bed is porous and fluffy enough to permit the flow therethrough of cooling gas at superatmospheric pressure in the range from 1 cm of Hg-2 psig, typically 105-120 kPa with a pressure drop in the range from 3-12 kPa, typically 5-7 kPa, through a bed 30-38 cm deep. This characteristic allows one to maintain a specified temperature profile in the bed which profile avoids overheating the unsintered powder, and avoids distorting the sintered part not only as it is formed slice-wise, but also after the part is formed, and the part lies removably embedded in the heated part bed.

Though the importance of a two-tier particle size weight distribution was disclosed with respect specifically to wax particles in the copending '746 application, it was not then realized that the ranges of particle sizes in each tier of the two-tier distribution controlled both, the density of the sintered part, and the sinterability of the powder. Neither was it known that the distribution of particle sizes in a two-tier distribution was as critical as the viscosity characteristics of the material as a function of temperature.

Because the SLS-window is critically defined by the requirements of the SLS process, the part bed (and sometimes the powder bed) must be indirectly heated to negate the proclivity of the sintered layer to "curl". If the part bed temperature, at least near its surface, is near $T_s$, the risk of curling is lowest when the feed bed temperature is high enough to allow powder delivered to the part bed to enter the SLS-window quickly, before the just-sintered slice can curl. To minimize the curling of a slice as it lies on a part bed, it has been discovered that a critical temperature profile is to be maintained in the bed, with a slight but narrowly specified temperature gradient on either side of a horizontal zone through the portion of the bed occupied by the sintered part, referred to as the "hot" zone.

The gradient in a part bed in a SLS machine operating effectively, is first positive, that is, the temperature increases to a maximum, then the gradient is negative, that is the temperature decreases from the maximum. The upper temperature gradient in the upper portion of the bed is positive, that is the temperature increases until it reaches a maximum temperature $T_{max}$ in the hot zone. The lower temperature gradient in the lower portion of the bed is negative, that is the temperature decreases from $T_{max}$ in the hot zone to the bottom of the bed.

More specifically, the temperature in the upper portion of the bed progressively increases as one moves downward from the upper surface of the bed to $T_{max}$ in the vertical plane; then progressively decreases as one moves downward from $T_{max}$ to the bottom surface of the part bed, which surface is in contact with the bed-supporting piston.

The gradient in a conventional SLS machine without controlled gas cooling of the part bed, in each direction is typically more than 2° C./cm (5° C./in). Such a gradient was found to be too high to provide an acceptable risk of either thermooxidative degradation of the powder, or, of distortion of the sintered part.

These considerations lead to temperature limits in the feed and part beds which limits define the G'-window or T-window, namely, (i) the temperature at which the part bed is maintained, and the temperature profile therein, and (ii) the temperature at which the feed bed is maintained.

In turn, the temperature at which the part bed is maintained is defined by (a) a lower (minimum) part bed temperature below which curling is so pronounced as to negate any reasonable probability of effecting a layer-wise fusion of plural vertically contiguous layers; and, (b) an upper (maximum) temperature at which interparticle viscosity in the part bed makes it so "sticky" as to fuzz (obfuscate) the predetermined boundaries of the part to be made. All sintered powder between vertically spaced apart lateral planes in the part bed is solidified sufficiently to have mechanical strength. The remaining unsintered powder remains freely flowable.

SUMMARY OF THE INVENTION

A method has been discovered which allows the operation of a SLS machine so as to make it possible to recover individual freely flowable particles of a laser-sinterable powder, and the recovered, used powder is recycled for reuse in the part bed of the SLS machine.

It has also been discovered that if a sinterable powder provides a quiescent part bed of adequate porosity to permit the downward flow of a cooling gas through the bed at a low enough pressure and at a rate insufficient to disturb powder on the surface of the bed, a unique temperature profile in the vertical plane of the bed may be imposed upon it, to permit sintering the part essentially free of distortion, and without thermally degrading or clumping the unsintered powder; if the powder is also oxidatively degradable, the bed may be operated with a downflow of inert cooling gas without thermooxidatively degrading the unsintered powder; in either event, the process allows recovery and recycle of reusable, unsintered powder.

It is therefore a general object of this invention to provide a method of operating a part bed in a SLS machine so as to recover and re-use a thermally degradable organic or inorganic powder in a SLS machine without sacrificing the physical properties of the sintered article relative to those properties of an article sintered from virgin powder.

It is also a general object of this invention to provide a method for operating a SLS machine with a part bed of tailored powder of a TOD semicrystalline material having sufficient porosity to allow the flow through the bed of an inert cooling gas flowed through it in an amount at least 10 times less than that required to maintain an oxygen-starved atmosphere in the sintering chamber, preferably less than <0.4% $O_2$, and recovering used but unsintered powder from the part bed, in pristine enough a condition to be used to yield a sintered part essentially indistinguishable from one made from virgin powder.

It is a specific object of the invention to operate the novel SLS process with a specified $O_2$ concentration in the atmosphere around a part bed of TOD powder is maintained at less than 3000 ppm; and, simultaneously, a temperature profile is maintained in the part bed with a downflow of inert cooling gas stream through the bed. Otherwise, the powder is sintered with a conventional SLS protocol. The recycled powder yields a sintered article which has physical properties which are essentially indistinguishable from those of an article sintered from virgin powder.

It is a specific object, in the best mode, to operate a SLS machine to make a near-fully dense part, with the recovery of a recyclable powder from the part bed, which recyclable powder has the following physical properties:

(a) a major portion by weight of the powder, and preferably essentially all the powder has a sphericity in the range from greater than 0.5 to 0.9, and a two-tier size distribution of primary particles in which the number of particles smaller than 53µm is greater than 80%, preferably >90%, most preferably >95%, the remaining particles being no larger than 180µm, that is, with a powder with substantially no particles (that is <5%) larger than 180µm; provided further that a layer of said powder no more than 250µm deep absorbs essentially all infrared energy at the 10.6µm wavelength beamed therethrough, and absorbs more than 50% of said energy in a layer no more than 180µm thick;

(b) a crystallinity in the range from 10% to 90%, preferably from 15% to 60%, a number average molecular weight in the range from about 30,000 to 500,000, preferably 60,000–300,000, and a molecular weight distribution $M_w/M_n$ in the range from 1 to 5, preferably from 1.2 to 3;

(c) a "SLS-window" in the temperature range from 2° C.–25° C. between the softening temperature $T_s$ of the powder and its "caking temperature" $T_c$, such that the powder has a "flow time" of <20 sec for 100 g in a funnel test (ASTM D1895-61T) at a temperature near $T_s$ in a range from 70° C. to 220° C., but below the powder's $T_c$;

(d) a melt viscosity in the range from 100–10$^4$ poise (10–1000 Pa-sec) when the temperature of the powder being sintered exceeds $T_c$ in less time than is required to melt contiguous large particles >53µm;

(e) the powder forms a 'part bed' in which the temperature profile is defined by sequential positive and negative temperature gradients through the part bed when the uppermost slice is less than 250µm thick and at a temperature in the range from 5° C. to 20° C., preferably from 8°–5° C., below that at which the powder softens; that is, the gradient from the upper surface of the bed to the maximum temperature of powder in the horizontal plane through a zone of maximum temperature is positive, the temperature increasing at from 0.2° C./cm (0.5° C./in) to 2° C./cm (5° C./in) of vertical depth, and the maximum temperature of the powder being no higher than the caking temperature $T_c$ of the powder; and, from the maximum temperature to the bottom of the bed is negative, the temperature decreasing at from 0.2° C./cm (0.5° C./in) to 2° C./cm (5° C./in).

The numerical value of the storage modulus $G'_s$ the recovered powder is much lower than the value of $G'$ at room temperature, and the temperature at which $G'_s$ is measured is in preferably the range from 5° C. to 25° C. below the $G'_c$ temperature of the powder.

It is therefore another general object of this invention to operate a SLS machine to recover an unsintered, recyclable polymer powder consisting essentially of an unblended polymer having the defined two-tier particle size distribution, and substantial crystallinity which provides a SLS-window of less than 25° C., and a $G'_c$ in the range from $1 \times 10^6 - 3 \times 10^6$ dynes/cm$^2$, which powder when sintered in a bed with a specified temperature profile, allows each layer of powder, in the range from about 25μm (1 mil) to about 250μm (10 mils) thick, is sintered without curling.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Figure 1:
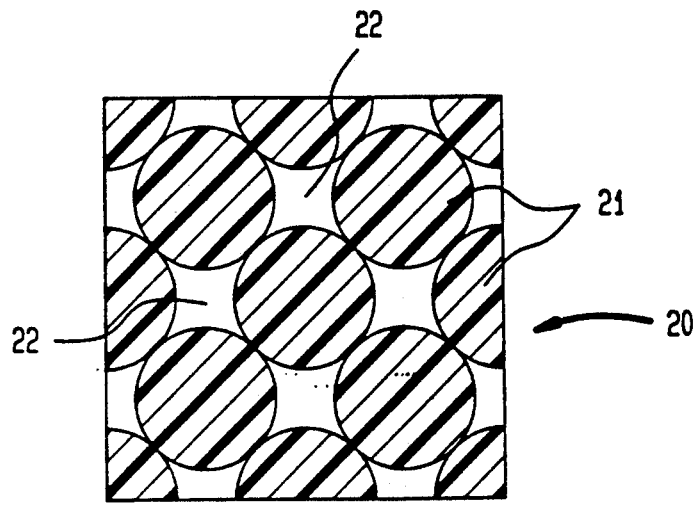
FIG. 1 is a schematic illustration of a bed of uniform spheres packed in a bed.
Figure 2:
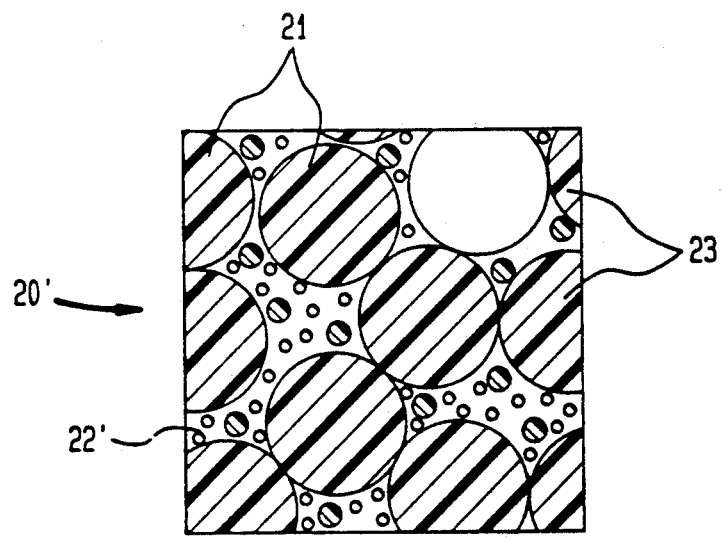
FIG. 2 is a schematic illustration of a bed of large spheres and very small ("too-small") spheres, showing that the too-small particles fit within the interstitial spaces between larger particles, and produce a bed of higher bulk density and correspondingly higher pressure drop.

The SLS machine specifically referred to herein uses a 10.6μm CO$_2$ laser, but any other infra-red laser-generating source may be used, as well as excimer lasers and neodymium glass lasers which generate in the near-infra-red. Powder is maintained as a quiescent bed in the part bed of the machine and sintered using a fluence in the range from 0.001 J/mm$^2$ to 0.1 J/mm$^2$, where fluence is the measure of the energy of the laser beam delivered to a defined area of powder. The laser is typically operated with a beam width of 0.6 mm and a power ranging from 8 to 22 watts at a scanning speed ranging from about 76.2 cm/sec to 178 cm/sec. By a "quiescent bed" we refer to a bed in which there may be slight movements of individual particles without causing channeling in the bed or measurably changing the pressure drop through the bed.

The process comprises, maintaining the quiescent bed of a tailored powder in a part bed of a sintering machine; flowing a stream of gas at a temperature below the softening temperature of the powder, downwardly through the upper surface of the bed, in an amount sufficient to cool the bed but insufficient to disturb particles at or near the surface of the bed, or to cause channeling in the bed; withdrawing the gas from the lower portion of the bed at a temperature no higher than the caking temperature $T_c$ of the powder; spreading powder from a feed bed onto the part bed by depositing the powder as a layer in the range from about 50μm to 180μm thick, preferably 125μm (0.005") thick, at a temperature near $T_s$ of the powder; directing a laser beam in a pattern obtained from a two dimensional section of a three-dimensional model with sufficient energy to form a sintered slice without permitting the slice to curl; depositing a second layer of the powder from the feed bed over the just-sintered layer in the part bed, and forming a second slice sintered to the first slice; again directing the laser beam to sinter regions of the bed patterned for a succeeding two-dimensional section; transferring another layer of powder from the feed bed and depositing the layer over the last-formed slice without permitting the slice to curl; repeating the foregoing steps seriatim, until all layers have been deposited and sequentially sintered into slices corresponding to successive sections of the three-dimensional model; forming a sintered three-dimensional object embedded in the part bed without forming undesirable growth on the surfaces of the sintered part; maintaining a positive temperature gradient from the upper surface of the bed to a maximum temperature in a horizontal zone through the portion of the bed occupied by the sintered part, referred to as the "hot" zone, the positive gradient increasing at from 0.2° C./cm (0.5° C./in) to 2° C./cm (5° C./in) of vertical depth, and, maintaining a negative gradient from the maximum temperature to the bottom of the bed, the negative gradient decreasing at from 0.2° C./cm (0.5° C./in) to 2° C./cm (5° C./in), the maximum temperature being no higher than the caking temperature $T_c$ of the powder; and, recovering a distortion-free sintered part and a freely flowable unsintered powder which is essentially undegraded thermally.

By "distortion-free" is meant that no dimension of the part is more than ±125μm, and no surface is out of plane by more than ±125μm.

If the powder is TOD, an inert gas is used, the flow rate being at least sufficient to maintain a concentration of less than 0.4% O$_2$, preferably 0.2%, most preferably <1000 ppm, in the bed.

In the best mode, the process is practiced with a semi-crystalline or substantially crystalline tailored powder to form a near-fully dense part. Among the requirements of such a powder uniquely tailored to yield, when sintered, a porous but near-fully dense article, are the following:

Free-flowing or Non-caking:

The powder is freely flowable and does not cake when stored for up to 24 hr, at a temperature in the range from 2° C. to 25° C. below its caking temperature; in particular, the powder does not cake even when stored in the part bed of the SLS machine, at a slightly higher temperature than its storage temperature in the feed bed which is no higher than the softening point of the powder. A determination as to whether a powder will meet the free-flowability requirement is made by the ASTM "flow time" test referred to hereinabove.

Maximum particle size and sphericity:

The powder has a sphericity >0.5 and contains essentially no particles having a nominal diameter exceeding 180μm. The maximum preferred diameter of a particle is substantially less than the thickness of a layer of particles rolled out of the feed bed and onto the part bed, namely about 8 mils (200μm).

Figure 3:
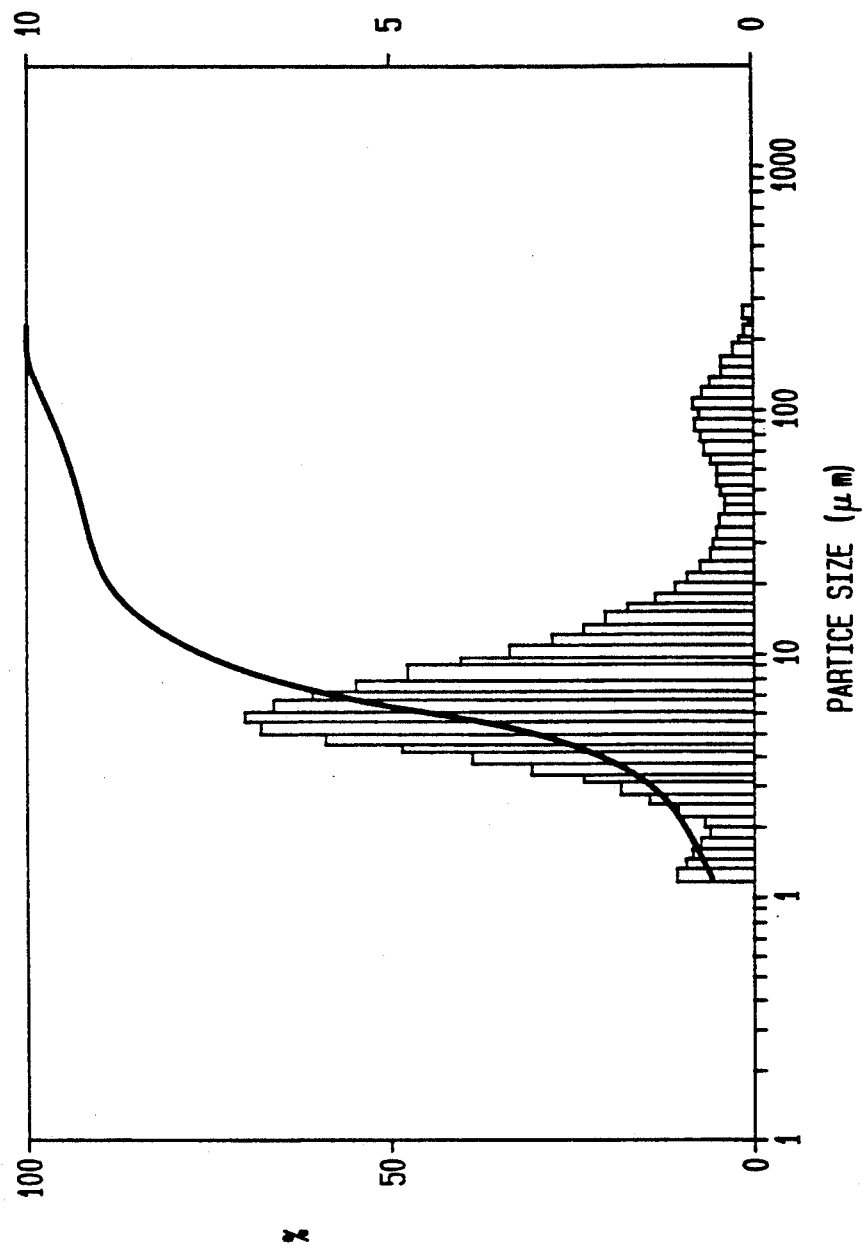
FIG. 3 is a graphical presentation of the number of particles smaller than 53μm, and the number >53μm, in a two-tier distribution of sizes in a particular tailored powder, namely Nylon 11.

Referring to FIG. 3 there is presented in graphical form the number average particle distribution of Nylon 11. This powder was produced from Nylon 11 (lot #R256-A02) having a number average molecular weight in the range from 75,000 to 80,000 and a molecular weight distribution in the range from 1.2–1.7.

The Nylon 11 was ground in a manner which produces a mixture of relatively coarse particles having a sphericity greater than 0.5 and a wide distribution of smaller particles. The mixture was then sieved to eliminate substantially all particles larger than 180μm, and the remaining particles were classified so as to conform to the number distribution shown in FIG. 3. The size distribution of the particles is obtained with a Malvern instrument which measures the size of the particles with a laser beam.

Flowability in the SLS-window:

The melt viscous flow of polymer powder on the surface of particles heated by the laser is determined by maintaining a temperature balance. For good interdiffusion of the polymer chains (sufficient to provide particle-to-particle adhesion, and layer-to-layer adhesion), a low melt viscosity is desirable. However, part definition is lost if significant melting occurs because the melt cannot be tightly confined near boundaries of the part being formed. Sintering is effected without means to assure isolation of the desired part features.

The SLS-window is of importance at this step (and step 1) because the temperatures of both beds, the feed bed and the part bed are elevated. Since the temperature of the part bed is elevated to the softening point of the powder to minimize curling, the wider the SLS-window, the greater the processing latitude provided by the powder. Maintaining the balance of properties in a tailored powder permits the requisite particle-to-particle fusion within a layer, and also layer-to-layer fusion, both of which are necessary to make a porous but near-fully dense part.

Figure 4:
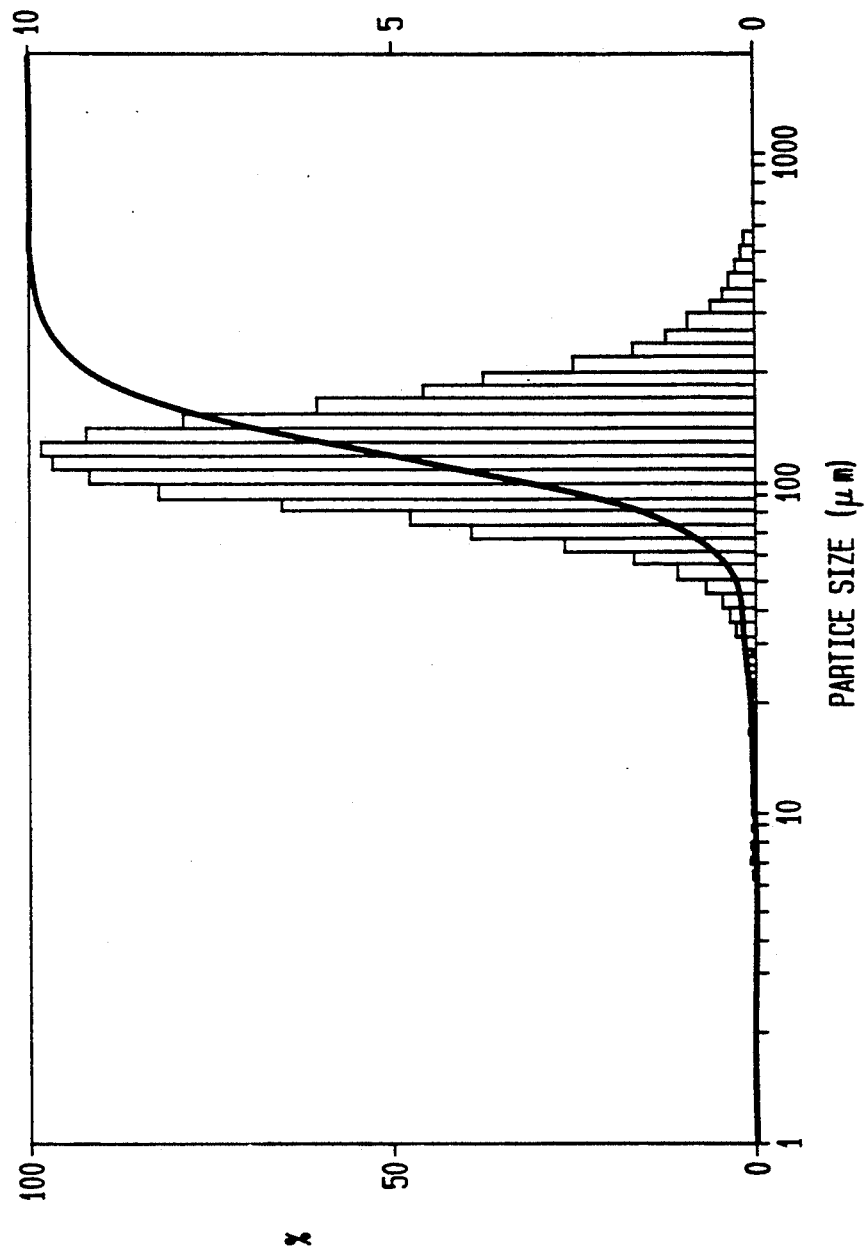
FIG. 4 is a graphical presentation of the volume distribution of the same powder for which the number distribution is illustrated in FIG. 3.

Referring to FIG. 4 there is shown a volume distribution curve of the same particles for which the number distribution is illustrated in FIG. 3, to show why the powder is freely flowable and how much of the volume in a bed of particles is occupied by "large particles". It appears that the few large particles are mainly responsible for rolling out the small particles with them, and also for permitting the essentially unobstructed passage of inert gas downwardly through the bed.

Growth:

Since the finished (sintered) three-dimensional (3-D) part(s) are formed in the part bed in which the unsintered powder provides mechanical support for the sintered part, the part is subject to the thermal changes in the part bed due to the presence of the sintered part. Sequential, sudden heating of successive slices of powder in a thermally insulated environment causes the bed temperature to rise. The insulating environment is due to the sintered part being surrounded by a mass of porous powder which is a good insulator. When the temperature around the sintered part is either not low enough, or too high, the sintered part will distort due to stresses in the bed. In addition, if the surfaces of the hot sintered part are too hot, there is "growth" on the surfaces of the finished part which must be removed and this can usually only be done by machining the growth away. When some "growth" does occur with the use of a tailored powder, the growth is so slight that it can be removed without damage to the surfaces of the part. If there is substantial growth, the part made is scrapped.

That the presence of the few large particles is critical in the two-tier distribution will be understood when it is realized that too-small particles, if not rollingly deposited on the part bed, would get packed and obstruct flow of the inert gas. The effect of being rollingly deposited layer-wise onto the surface of the bed results in a "fluffy" bed which is dynamically stable but quiescent and relatively porous. The bed densities of a powder when not rollingly deposited are typically at least 20% higher than that of a bed of rollingly deposited powder.

Figure 5:
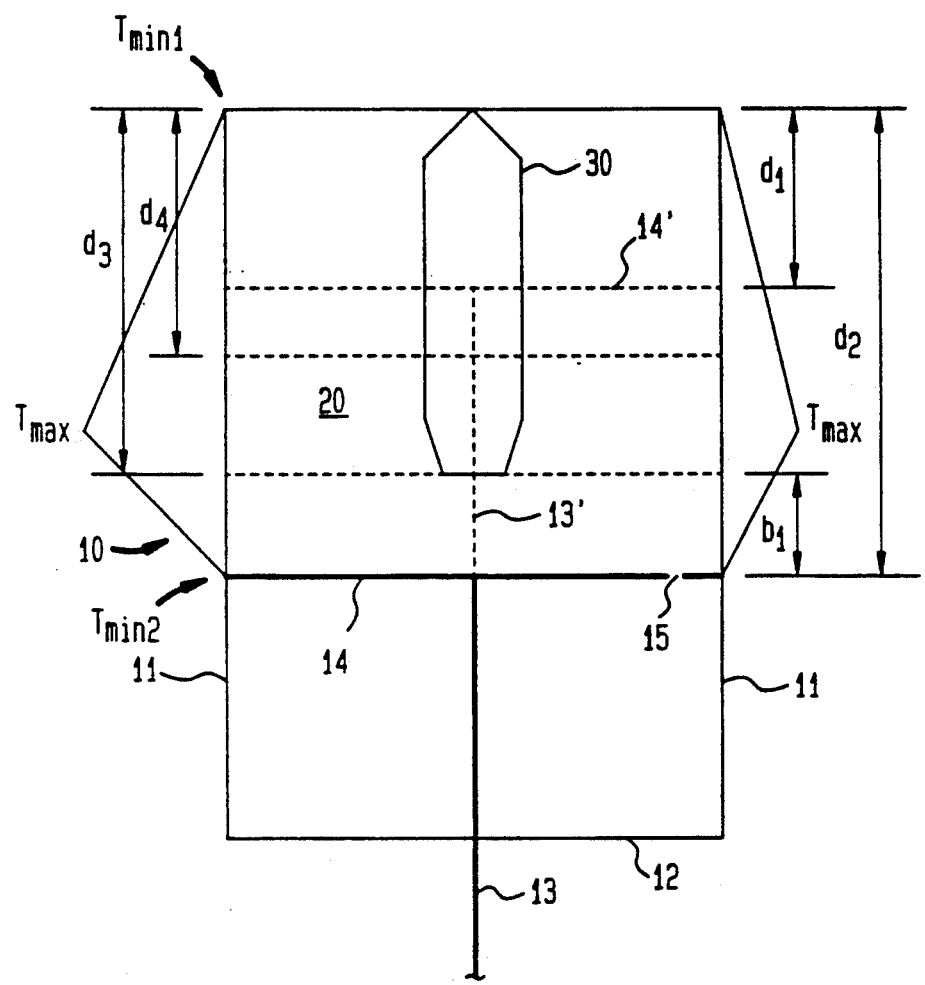
FIG. 5 is a schematic illustration of an elevational cross-sectional view of a cylindrical part bed of a SLS machine showing the position of the bed-supporting cylinder near the top of the cylinder at the beginning of the sintering procedure, and after the sintered part is formed; along with indications of the temperature profile within the bed for the tailored powder of this invention used with a conventional SLS procedure (on the left) without exteriorly controlling the temperature profile; and for the tailored powder with exterior temperature control of the bed temperature profile (right hand side).

The importance of controlling the top-to-bottom temperature profile within the part bed will be better understood by reference to FIG. 5.

The preferred crystallinity of a tailored powder which produces a near-fully dense sintered part with minimal growth is that which is correlatable to an observed heat of melting by DSC in the range from 30–60 cals/gm.

Referring to FIG. 5 there is shown schematically, in cross-sectional view, a cylindrical part bed referred to generally by reference numeral 10, having cylindrical sidewalls 11 and a bottom 12 through the center of which is slidably inserted a piston rod 13 having a piston 14 with a flat horizontal surface which supports a bed of TOD powder 20. The part bed is therefore confined except for its upper surface which presents a target surface for the directed laser beam (not shown). An inert gas, preferably nitrogen or argon, is flowed downwardly through the upper surface of the bed.

The flow rate of inert gas is sufficient to maintain a concentration of less than 0.4% oxygen, based on the volume of the bed, within the bed, so that the atmosphere above and within the part bed is substantially free of oxygen (referred to as being "essentially oxygen-free"). More preferably, enough inert gas is flowed through the bed to maintain a concentration of less than 0.1% oxygen, but the flow rate of gas is insufficient to disturb the quiescent bed. A disturbed bed is visually detectable by channeling, particularly near the periphery of the bed, and by visible swirling of particles at the surface. Relatively little flow is required to maintain the oxygen-free environment and control the temperature profile within the bed. For example, a part bed 30 cm in diameter requires only from 1 liter/min to 5 L/min of $N_2$ to maintain the oxygen-free bed and also a desirable temperature profile, provided further that the pressure drop through a quiescent part bed 38 cm deep with a gas flow of 5 L/min through the bed is less than 6.89 Kpa (1 psi). The amount of gas flowed is not narrowly critical provided it is insufficient to cause channelling in the bed, or otherwise disrupt the bed, and sufficient to maintain the desired temperature profile in the bed.

To allow the inert gas to be withdrawn from the bottom of the part bed, a through-passage is provided in the piston 14, the passage having a relatively large diameter in the range from about 2.5 cm to 3.5 cm to be press-fitted with a porous sintered metal disc 15. The disc provides essentially free-flow of the inert gas through it. A typical part bed has a diameter of 30.5 cm, and the travel of the piston from the bottom 12 to the top of the walls 11 is 38.1 cm.

A cylindrical part 30 with tapered ends, the bottom being truncated, is formed by sintering layer upon layer of preheated tailored powder, starting with the piston in the position indicated by its phantom outline at 14', supporting a bed of preheated powder about 10 cm deep, indicated by the depth $d_1$. The powder and walls of the cylinder are heated by infrared heating means to keep the temperature of the bed about 10° C. below the sticky temperature of the powder. However, it is difficult to heat the piston within the cylinder so that the piston is typically at a slightly lower temperature than the powder. Further, the mass of the piston provides a heat sink to which the bottom layer of powder dissipates heat faster than any other layer. The upper surface of the bed is in the same plane as the top of the cylinder over which the roller (not shown) of the SLS machine distributes powder from the feed bed (also not shown).

As layer upon layer of powder is sintered, forming sequential horizontal slices of the sintered part 30, the piston 14' moves downwards until finally the part is completely sintered. The sintered part 30 is thus supported on the bed of powder on the bottom, and the depth of this lower portion of the bed is indicated as being $b_1$. This bed is the same initially presented as the target, and its depth $b_1$ remains numerically equal to the depth $d_1$ when the piston 14 has moved down to a depth indicated by $d_2$. The sintered part 30 rests on the bed of powder $b_1$ thick, the bottom of the sintered part being at a depth $d_3$.

Referring now to the results of a conventional SLS procedure, there is formed a hot sintered part 30 dissipating heat to the powder 20 surrounding it in unsteady state heat transfer. The lower portion $b_1$ forms a relatively cool zone of powder which dissipates heat to the piston 14, and through which powder heat from the part 30 is relatively well dissipated by convection currents through the bed $b_1$.

As soon as sintering is completed, the upper portion of the bed having depth $d_4$, particularly near the surface, begins to dissipate heat from part 30 lying within upper portion $d_4$. Heat dissipated by the part 30 is transferred relatively well mainly by convection currents through the upper portion $d_4$ of the powder bed 20, and less effectively through lower portion $b_1$.

The portion of the sintered part 30 lying in the intermediate portion of the bed 20, that is, the portion between the bed depths $d_1$ and $b_1$, is relatively well insulated by the surrounding powder. Heat from the part 30 causes the temperature to rise so that a maximum temperature $T_{max}$ is reached. The temperature at the surface of the relatively quickly cooling upper portion of the bed, is indicated by $T_{min1}$ and the temperature of the relatively quickly cooling lower portion of the bed $b_1$ is indicated by $T_{min2}$. It is thus seen that a temperature profile is established in the bed, the maximum temperature being substantially above the lowest temperatures in the profile, and located in a horizontal zone intermediate the upper and lower surfaces of the bed.

In the conventional SLS procedure, using the tailored powder, there is no forced cooling of the heated bed with gas so that a typical gradient between $T_{min1}$ and $T_{max}$, and between $T_{max}$ and $T_{min2}$ is more than 2° C./cm in each case (on either side of $T_{max}$). For example, if $T_{min1}$ at the upper surface after sintering is 175° C., $T_{max}$ is 182° C. and $T_{min2}$ is about 171° C. Because $T_{max}$ is very close to the melting point 183° C. of the powder, the sintered part is exposed to a high likelihood of being distorted. It will be evident that a large part of this powder could not be sintered successfully in a conventional SLS bed because $T_{max}$ will exceed $T_c$ and the part will distort.

In FIG. 5, on the left hand side thereof, the straight lines drawn connecting the temperatures at the surface and bottom of the bed, are drawn on the assumption that the gradient is a straight line, which it most probably is not, but the linear representation serves as an approximation to focus the fact that the gradient is steeper for the conventional SLS procedure than it is for the novel procedure in which an inert cooling gas is flowed through the bed while the part is being sintered.

In the procedure with forced cooling, using the tailored powder, the porosity of the bed permits forced cooling of the heated bed with inert gas, so that a typical gradient between $T_{min1}$ and $T_{max}$, and between $T_{max}$ and $T_{min2}$ is less than 2° C./cm in each case. For example, if $T_{min1}$ at the upper surface after sintering is 175° C., $T_{max}$ is 177° C. and $T_{min2}$ is about 173° C. Because $T_{max}$ is not close to the melting point 183° C. of the powder, the sintered part is not likely to be distorted.

The temperature profile for the process conditions using the inert cooling gas are shown on the right hand side of FIG. 5, where it is seen that the gradient to $T_{max}$ is less, and $T_{max}$ itself is lower than it was in the conventional SLS process. Thus, the risk of part distortion is minimized as is the thermal degradation to the powder surrounding the sintered part. Such thermal degradation occurs when the powder is over-heated, that is, too far past its softening point, even if it is not heated past its $G'_c$ temperature.

Figure 6:
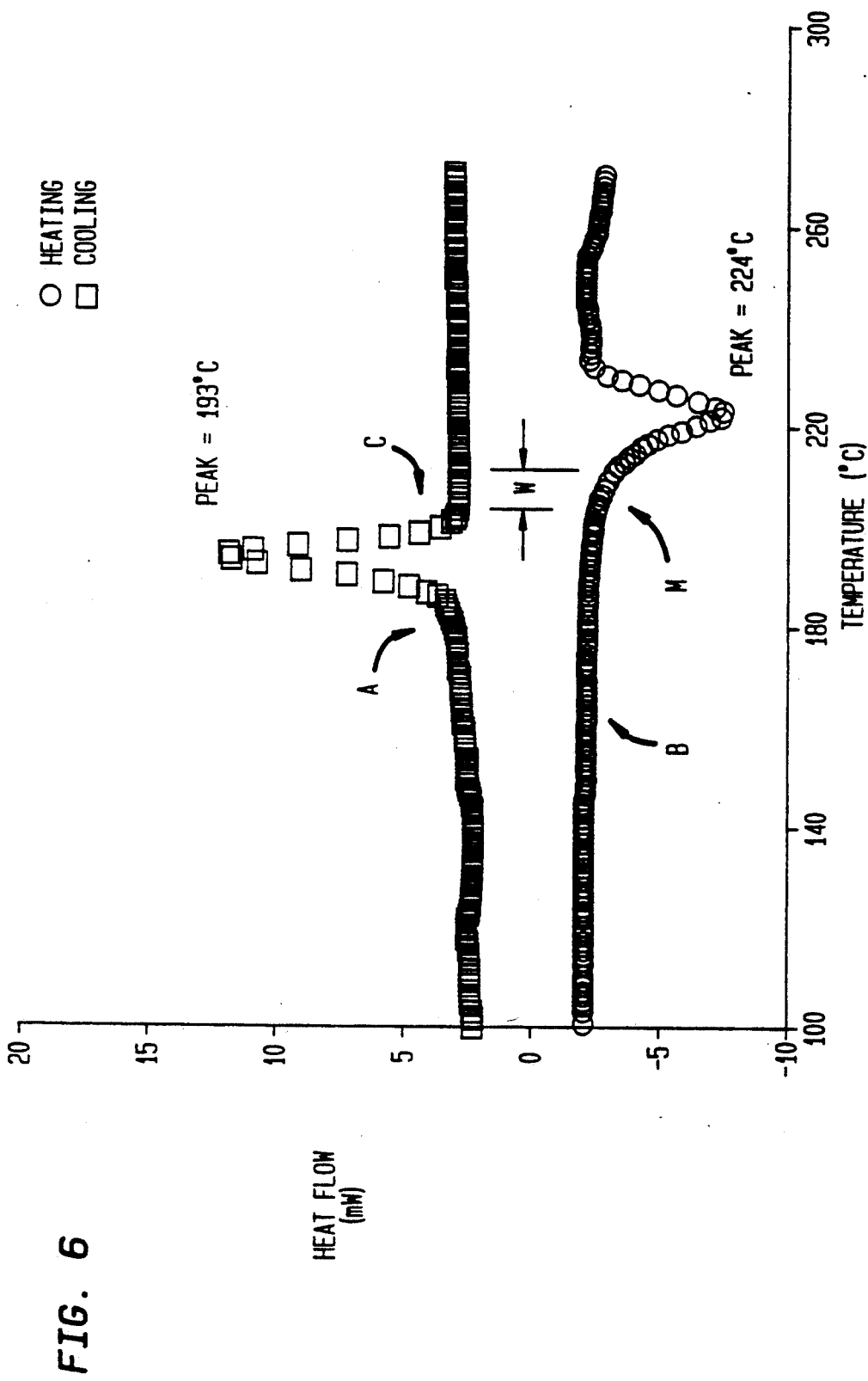
FIG. 6 shows DSC scans for the heating and cooling curves of a laser-sinterable PBT powder.

To put the foregoing details in perspective one may evoke a physical picture of the SLS-window by reference to FIG. 6 in which curve A (plotted with squares to track heat flow) represents the cooling curve for a sample of tailored PBT powder. The peak occurs at 193° C., but supercooling commences near the temperature 202° C., a point indicated by the arrow C. Curve B (plotted with circles) represents the heating curve for the same sample. The peak occurs at 224° C., but onset of melting commences near the temperature 212° C., a point indicated by the arrow M. Thus, the window W is provided by the difference in the temperatures at M and C, which for this sample of PBT is 10° C.

ILLUSTRATIVE EXAMPLES

In the following illustrative examples the powder used is Nylon 11 having a Mn of about 80,000; Mw/Mn=1.6, and $G'_c = 2 \times 10^6$ dynes/cm$^2$ at 175° C., and in each case, the powder was sintered into test bars with a beam width of 0.6 mm, the laser power set at 8 watts and a scan speed of 175 cm/sec.

In Table 1, the column labeled "SLS Conventional" presents the results obtained with bars made with the conventional SLS process using untailored powder having particles smaller than 210μm, and no downflow cooling of the bed; in the column labeled "SLS This Invention" are the results obtained with test bars made using the novel SLS process with tailored powder having no particles greater than 180μm, and downflow cooling of the bed, using 5 L/min of $N_2$ flowed downwardly through the part bed so that there was less than 1000 ppm of $O_2$ in the effluent gas from the bottom of the bed; in the column labeled "Compression molded" are the results obtained with compression molded test bars of the conventional untailored powder, molded at 200° C. and 2070 kPa (300 psig).

In each case the bars were sintered in a part bed having a diameter of 30 cm which can hold powder to a depth of 37.5 cm. In each case, the powder was maintained in the feed bed at below $T_s$ and the powder was transferred by a roller to the part bed, the surface of which was near $T_s$. In each case, the bed was heated by an external electric heater to bring it up to temperature and temperature probes inserted at various location in the bed recorded the temperature profile generated during sintering of a part.

It is evident that the physical properties of the bars of tailored powder sintered under oxygen-free conditions are essentially the same, that is, within 10% or less, as those obtained for the compression molded bars, and far better than those obtained for the bars conventionally sintered in an oxygen-starved atmosphere.

The only properties of the bars made with the novel process which are noticeably lower are those related to tensile strength at ultimate elongation. This is because the very small discontinuities in the sintered bar which derive from its slightly porous structure, provide propagation sites for failure under tensile at ultimate elongation. However, evidence that the non-porous regions of the sintered part of tailored powder have the same structure as the regions of the compression molded part is provided by photomicrographs of the respective fracture surfaces. There is no visible difference between the structures photographed in areas where there are no cavities.

Other preferred semi-crystalline polymers which are successfully tailored for use in the SLS machine are polybutylene terephthalate (PBT); polypropylene (PP); polyethylene (PE) and polyacetal (PA). The preferred mean particle diameter for each of the tailored powders is in the range from 80μm–100μm. The values for these powders are given in the following Table 2.

Having thus provided a general discussion, described the overall process in detail and illustrated the invention with specific examples of the best mode of carrying out the process, it will be evident that the invention has provided an effective solution to a difficult problem. It is therefore to be understood that the claims are not to be limited to a slavish duplication of the invention and no undue restrictions are to be imposed by reason of the specific embodiments illustrated and discussed.

TABLE 1

| Property | Values | | |
|---|---|---|---|
| | SLS Conventional | SLS This Invention | Compression Molded |
| Thermal | | | |
| Glass Transition (°C.) | 45 | | |
| Melt (onset, °C.) | 177 | | |
| Heat Distortion | | | |
| @ 264 psi (°C.) | 43, 45 | 46, 46 | 41, 41 |
| @ 66 psi (°C.) | 161, 162 | 163, 167 | 163, 159 |
| TGA (onset of degradation) | 430° C. | not measured | |
| Mechanical | | | |
| Tensile (5 mm/min crosshead) | | | |
| Modulus (psi) [σ] | 169,400 [26,560] | 201,100 [10,540] | 207,700 [11,630] |
| Elongation, ultimate (%) | 45.7 [3.6] | 28.0 [5.3] | 201.6 [151] |
| Strength (psi) | 5950 [178] | 6323 [157] | 6315 [115] |
| Elongation, yield (%) | 30.7 [1.6] | 26.0 [3.3] | 30.0 [1.3] |
| Energy to break (lb-in) | | 205 [53] | 2,149 [316] |
| Tensile (50 mm/min crosshead) | | | |
| Modulus (psi) | 208,600 [6782] | 221,500 [28,610] | 227,800 [18,890] |
| Elongation, ultimate (%) | 36.0 [12.6] | 27.0 [5.5] | 271.8 [146.3] |
| Strength (psi) | 6066 [313] | 6413 [130] | 6200 [517] |
| Elongation, yield (%) | 24.3 [2.0] | 24.1 [3.2] | 21.9 [9.3] |
| Energy to break (lb-in) | 276 [112] | 203 [43] | 1,995 [566] |
| Flexural | | | |
| Modulus (psi) | 138,900 [1192] | 146,800 [4147] | 176,900 [4368] |
| Strength (psi) | 6326 [23] | 7154 [159] | 7044 [271] |
| Elongation, yield (%) | .088 [.003] | .091 [.002] | .065 [.002] |
| Izod Impact (notched) | | | |
| @ 23° C. (ft-lb/in) | 1.63 [.23] | 1.4 [.2] | 1.89 [.24] |
| @ −40° C. (ft-lb/in) | .84 [.22] | 1.03 [.2] | |
| Physical | | | |
| Specific Gravity | 1.0125 [.0029] | 1.0204 [.004] | 1.0360 [.0004] |

TABLE 2

| Ex | Polymer | Feed Bed Temp. °C. | Part Bed Temp. °C. | Part Dens. gm/cm³ | Full Dens. gm/cm³ | Notch Impact | HDT °C. | MAX STRESS psi | FLEX MOD psi |
|---|---|---|---|---|---|---|---|---|---|
| 1 | Nylon 6 | 140 | 180 | 0.958 | 1.04 | 1.5 | 175 | 11510 | 272100 |

TABLE 2-continued

| Ex | Polymer | Feed Bed Temp. °C. | Part Bed Temp. °C. | Part Dens. gm/cm³ | Full Dens. gm/cm³ | Notch Impact | HDT °C. | MAX STRESS psi | FLEX MOD psi |
|---|---|---|---|---|---|---|---|---|---|
| 2 | Nylon 11 | 135 | 165 | 0.919 | 0.987 | 1.67 | 166 | 8310 | 159900 |
| 3 | Nylon 12 | 75 | 160 | 0.90 | 1.01 | 0.39 | 163 | 8120 | 150750 |
| 4 | P'Acetal | 130 | 150 | 1.283 | 1.41 | 0.72 | 149 | 9468 | 312400 |
| 5 | PBT | 160 | 195 | 1.19 | 1.31 | 0.29 | 206 | 8270 | 299700 |

*(ft-lb/in): Izod impact, notched - measured at 23° C.

We claim:

1. A process for forming a sintered part from a laser-sinterable powder of a thermally degradable material contained in a part bed of a selective laser sintering machine, and recovering a recyclable powder reusable in said machine, comprising,
    (a) maintaining a quiescent bed of said laser-sinterable powder in said part bed;
    (b) flowing a stream of a cooling gas downwardly through the upper surface of said bed at superatmospheric pressure in the range from 105 kPa–120 kPa with a pressure drop in the range from 3–12 kPa, a temperature below said powder's softening temperature $T_s$ at a flow rate insufficient to disturb particles at or near the surface of the bed, or to cause channeling in the bed;
    (c) withdrawing said cooling gas from said part bed's lower portion at a temperature no higher than the caking temperature $T_c$ of said powder;
    (d) spreading powder from a feed bed onto said part bed as a first layer in the range from about 50μm to 180μm thick at a temperature near said $T_s$;
    (e) directing a laser beam in a pattern obtained from a two-dimensional section of a three-dimensional model, with sufficient energy to form a first sintered slice without permitting said first slice to curl;
    (f) depositing a second layer of said powder from said feed bed over said first slice and forming a second slice sintered to said first slice;
    (g) again directing said laser beam to sinter regions of said powder in said part bed, said beam being patterned for a successive two-dimensional section;
    (h) transferring a third layer of said powder from said feed bed and depositing said third layer over said second slice without permitting said second slice to curl;
    (i) repeating the foregoing steps seriatim, until all layers have been deposited and sequentially sintered into slices corresponding to successive sections of said part's three-dimensional model;
    (j) forming a sintered three-dimensional part embedded in said part bed without forming a growth of powder on surfaces of said sintered part;
    (k) maintaining a positive temperature gradient from said part bed's upper surface to a maximum temperature of powder in a horizontal plane through a zone of maximum temperature in said part bed, no higher than the caking temperature $T_c$ of said powder; and, maintaining a negative temperature gradient from said maximum temperature to said part bed's bottom; and,
    (l) recovering a distortion-free sintered part and a freely flowable unsintered powder.

2. The method of claim 1 wherein said positive gradient increases at from 0.2° C./cm (0.5° C./in) to 2° C./cm (5° C./in) of vertical depth, and, said negative gradient decreases at from 0.2° C./cm (0.5° C./in) to 2° C./cm (5° C./in).

3. The method of claim 2 wherein said material is thermooxidatively degradable and said cooling gas is an inert gas.

4. The method of claim 3 wherein a major portion by weight of said laser-sinterable powder has a sphericity in the range from greater than 0.5 to 0.9, and a two-tier particle size distribution of primary particles having an average diameter smaller from than 180μm, with substantially no particles >180μm, provided further that the number average ratio of particles smaller than 53μm is >80%, the remaining particles being in the size range from 53μm to 180μm; a layer of the powder no more than 250μm deep absorbs essentially all infra-red energy at the 10.6μm wavelength beamed therethrough, and absorbs more than 50% of that energy in a layer no more than 180μm thick.

5. The method of claim 4 wherein said pressure drop in the range from 5–7 kPa through a bed 30–38 cm deep, and said inert gas is selected from the group consisting of nitrogen and argon.

6. The method of claim 5 wherein said powder is thermooxidatively degradable, said number average ratio of particles smaller than 53μm is greater than 90%, said inert gas is flowed in an amount sufficient to maintain a concentration of less than 0.4% oxygen in said bed, based on the volume thereof, said powder has a crystallinity in the range from 10% to 90%, and a window of sinterability in the temperature range between said $T_s$ and said $T_c$.

7. The method of claim 6 wherein said number average ratio of particles smaller than 53μm is >95%, said powder has a crystallinity in the range from 15% to 60%, a number average molecular weight in the range from about 30,000 to 500,000, and a molecular weight distribution in the range from 1 to 5.

8. The method of claim 7 wherein said powder is nylon 11 and has a molecular weight distribution in the range from 1.2 to 3.

9. The method of claim 7 wherein said oxygen concentration is maintained at less than 0.1%, and, said powder is selected from the group consisting of nylon 6, nylon 11, nylon 12, polybutylene terephthalate and polyacetal.

10. The method of claim 4 wherein said laser beam has a wavelength of 10.6μm.

11. The method of claim 10 wherein said laser beam is directed with a beam width of 0.6 mm and a power ranging from 8 to 22 watts at a scanning speed ranging from about 76.2 cm/sec to 178 cm/sec.

12. In a method for recovering a thermally degradable laser-sinterable powder after forming a shaped part of arbitrary shape in a selective laser sintering machine by laser-sintering a laser-sinterable, thermally degradable organic or inorganic powder, by spreading a first layer of said powder from a feed bed in the machine onto a part bed containing said powder, downwardly flowing a gas through the upper surface of said part bed, directing a laser beam over a patterned portion of the surface of said part bed to form a first slice of sintered powder, depositing a second layer of said powder onto said first slice, again directing said laser beam over a patterned portion of said surface to form a second slice of sintered powder integral with said first slice, and repeating the foregoing steps seriatim to form said shaped part, the improvement comprising, (a) flowing said gas maintained in said machine at super-atmospheric pressure in the range from 105 kPa- 120 kPa at a temperature below said powder's softening temperature $T_s$, at a flow rate insufficient to disturb particles at or near the surface of the bed, or to cause channeling in the bed, but sufficient to maintain positive and negative temperature gradients in a vertical plane through said part bed, each gradient less than 2° C./cm (5° C./in);
  (b) withdrawing said gas from said part bed's lower portion at a temperature no higher than the caking temperature $T_c$ of said powder, with a pressure drop in the range from 3–12 kPa;
  (c) maintaining said positive temperature gradient from said part bed's upper surface to a maximum temperature in a horizontal plane through a zone of maximum temperature in said part bed, and, said negative temperature gradient from said maximum temperature to said part bed's bottom; and,
  (d) recovering a distortion-free sintered part and a recyclable, freely flowable unsintered powder from said part bed.

13. The method of claim 12 wherein said powder in said feed bed is at a temperature near said $T_s$ and said first layer of powder is in the range from about 50μm to 125μm thick.

14. The method of claim 13 wherein a major portion by weight of said powder has a sphericity in the range from greater than 0.5 to 0.9; at least 80% of the number of primary particles in the powder are in the range from about 1μm to 53μm, the remainder being no larger than 180μm, a layer of said powder no more than 250μm deep absorbing essentially all infra-red energy in a wavelength of 10.6μm, and absorbing more than 50% of said energy in a layer no more than 180μm thick.

15. The method of claim 14 wherein said gas is an inert gas flowed in an amount sufficient to maintain a concentration of less than 0.4% oxygen in said bed, based on the volume thereof.

16. The method of claim 15 wherein said inert gas is selected from the group consisting of argon and nitrogen, and said powder is of a synthetic resinous material selected from the group consisting of nylon, polybutylene terephthalate and polyacetal.

17. In a method for recovering a thermally degradable laser-sinterable powder after forming a shaped part of arbitrary shape by flowing a gas downwardly through the upper surface of a part bed containing said powder, spreading a first layer of said powder from a feed bed onto said part bed, directing a laser beam over a first patterned portion of the surface of said part bed to form a first slice of sintered powder, depositing a second layer of said powder onto said first slice, again directing said laser beam over a second patterned portion of said surface, the same or different from said first patterned surface, to form a second slice of sintered powder integral with said first slice, and repeating the foregoing steps seriatim to form said shaped part, the improvement comprising, (a) maintaining said powder near the surface of said feed bed near said powder's softening temperature $T_s$;
  (b) flowing a stream of a cooling gas downwardly through the upper surface of said bed at superatmospheric pressure in the range from 105 kPa- 120 kpa with a pressure drop in the range from 3–12 kPa, a temperature below said powder's softening temperature $T_s$ at a flow rate insufficient to disturb particles at or near the surface of the bed, or to cause channeling in the bed;
  (c) spreading each said layer of powder from said feed bed at a temperature near said $T_s$ without permitting a prior sintered slice to curl, so as to have one or more portions of said prior sintered layer rising more than about 50μm above said layer's surface in the horizontal x-y-plane, said powder having (i) a defined particle size and particle size distribution wherein said powder has a sphericity in the range from greater than 0.5 to 0.9, (ii) at least 80% of the number of primary particles in said powder are in the range from about 1μm to 53μm, the remainder being no larger than 180μm, (iii) a critical storage modulus in the range from $1 \times 10^6$ Pa to $3 \times 10^6$ Pa, at $T_c$;
  (d) maintaining a positive temperature gradient from said part bed's upper surface to a maximum temperature of powder in a horizontal plane through a zone of maximum temperature in said part bed, no higher than the caking temperature $T_c$ of said powder; and, maintaining a negative temperature gradient from said maximum temperature to said part bed's bottom; and,
  (e) recovering a distortion-free part and a recyclable, freely flowable unsintered powder from said part bed.

18. The method of claim 17 wherein said positive gradient increases at from 0.2° C./cm (0.5° C./in) to 2° C./cm (5° C./in) of vertical depth, and, said negative gradient decreases at from 0.2° C./cm (0.5° C./in) to 2° C./cm (5° C./in).

19. The method of claim 18 wherein said material is thermooxidatively degradable and said cooling gas is an inert gas.

20. The method of claim 19 wherein a major portion by weight of said laser-sinterable powder has a sphericity in the range from greater than 0.5 to 0.9, and a two-tier particle size distribution of primary particles having an average diameter smaller from than 180μm, with substantially no particles >180μm, provided further that the number average ratio of particles smaller than 53μm is >80%, the remaining particles being in the size range from 53μm to 180μm; a layer of the powder no more than 250μm deep absorbs essentially all infra-red energy at the 10.6μm wavelength beamed therethrough, and absorbs more than 50% of that energy in a layer no more than 180μm thick.

21. In a method for recovering a thermally degradable laser-sinterable powder after forming a shaped part of arbitrary shape by flowing a gas downwardly through the upper surface of a part bed containing said powder, said powder consisting essentially of freely-flowable particles near their softening temperature $T_s$, the improvement comprising, (a) flowing a stream of a cooling gas downwardly through the upper surface of said bed at superatmospheric pressure in the range from 105 kPa- 120 kPa with a pressure drop in the range from 3–12 kPa, a temperature below said powder's softening temperature $T_s$ at a flow rate insufficient to disturb particles at or near the surface of the bed, or to cause channeling in said bed; and, (b) operating said bed of said powder with a temperature profile defined by sequential positive and negative temperature gradients in a vertical plane through said bed when a layer thereof, less than 250μm, thick near the surface, is at a temperature near said $T_s$, said positive gradient from the upper surface of the bed, to the maximum temperature in the horizontal plane, increases at from 0.2° C./cm (0.5° C./in) to 2° C./cm (5° C./in); and, said negative gradient from the maximum temperature to the bottom of the bed decreases at from 0.2° C./cm (0.5° C./in) to 2° C./cm (5° C./in).

22. The method of claim 21 wherein said powder consists essentially of an unblended polymer having a two-tier particle size distribution said powder having the following properties:

(a) freely-flowable semi-crystalline powder having a crystallinity in the range from 10–90% measured by differential scanning calorimetry;
(b) a major portion by weight of the powder having a sphericity in the range from greater than 0.5 to 0.9, and a two-tier distribution in which substantially no primary particles has an average diameter greater than 180μm, provided further that the number average ratio of particles smaller than 53μm is greater than 80%, the remaining larger particles being in the size range from 53μm to 180μm; a layer of said powder no more than 250μm deep absorbing essentially all infra-red energy beamed therethrough at a wavelength of 10.6μm, and a layer of said powder no more than 18082 m thick absorbing more than 50% of said energy;
(c) a number average molecular weight in the range from about 30,000 to 500,000, and a molecular weight distribution $M_w/M_n$ in the range from 1 to 5; and,
(d) a window of sinterability in the temperature range from near said powder's softening temperature $T_s$ to said powder's caking temperature $T_c$.

* * * * *